(12) United States Patent
Srivastava et al.

(10) Patent No.: US 8,663,501 B2
(45) Date of Patent: Mar. 4, 2014

(54) GREEN EMITTING PHOSPHOR

(75) Inventors: Alok Mani Srivastava, Niskayuna, NY (US); Holly Ann Comanzo, Niskayuna, NY (US); Gopi Chandran Ramachandran, Bangalore (IN); Samuel Joseph Camardello, Albany, NY (US); Swarnagowri Addepalli, Bangalore (IN); Florencio Garcia, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 302 days.

(21) Appl. No.: 13/171,684

(22) Filed: Jun. 29, 2011

(65) Prior Publication Data
US 2013/0002123 A1 Jan. 3, 2013

(51) Int. Cl.
*C09K 11/64* (2006.01)
*H01J 61/44* (2006.01)

(52) U.S. Cl.
USPC ............ 252/301.4 P; 252/301.4 R; 313/486; 313/487

(58) Field of Classification Search
USPC .............. 252/301.4 P, 301.4 R; 313/486, 487
See application file for complete search history.

(56) References Cited

U.S. PATENT DOCUMENTS

| 4,447,756 | A | 5/1984 | Kohmoto et al. |
| 4,748,374 | A | 5/1988 | Van Loosdregt |
| 5,422,040 | A | 6/1995 | Maofu et al. |
| 5,635,109 | A | 6/1997 | Otsuka |
| 5,811,924 | A | 9/1998 | Okumura et al. |
| 6,278,135 | B1 | 8/2001 | Srivastava et al. |
| 7,126,274 | B2 | 10/2006 | Shimizu et al. |
| 7,202,598 | B2 | 4/2007 | Juestel et al. |
| 2003/0155857 | A1 | 8/2003 | Soules et al. |

FOREIGN PATENT DOCUMENTS

| EP | 1108772 A2 | 6/2001 |
| GB | 701031 A | 12/1953 |

OTHER PUBLICATIONS

Kim et al., "Synthesis of Green-Emitting (La,Gd)OBr:Tb3+ Phosphors", Materials, vol. 3, No. 4, pp. 2506-2515, 2010.
Liu et al., "Preparation and Its Luminescent Properties of AlPO4:Eu3+ Phosphor for w-LED Applications", Journal of Alloys and Compounds, vol. 509, No. 21, pp. L199-L202, May 26, 2011.
Liu et al., "A Novel Green Luminescent Material AlPO4:Tb3+", Materials Letters, vol. 65, No. 12, pp. 1853-1855, Jun. 30, 2011.
Search Report and Written Opinion from corresponding PCT Application No. PCT/US2012/044277 dated Sep. 19, 2012.

*Primary Examiner* — Carol M Koslow
(74) *Attorney, Agent, or Firm* — Mary Louise Stanford

(57) ABSTRACT

Cerium, gadolinium and terbium doped aluminum phosphates of formula I may be used in fluorescent lamps $$Al_{1-x-y-z-a-b-c-d-e}Tb_xCe_yGd_zLu_aSc_bIn_cLa_dGa_ePO_4 \quad \text{I}$$

wherein
x is greater than or equal to about 0.001 and less than or equal to about 0.3;
y is greater than or equal to about 0.001 and less than or equal to about 0.3;
z is greater than or equal to about 0.01 and less than or equal to about 0.3;
a is greater than or equal to about 0.01 and less than or equal to about 0.1;
b is greater than or equal to about 0.01 and less than or equal to about 0.1;
c is greater than or equal to about 0.01 and less than or equal to about 0.1.
d is greater than or equal to about 0.01 and less than or equal to about 0.1; and
e is greater than or equal to about 0.01 and less than or equal to about 0.1.

25 Claims, 1 Drawing Sheet

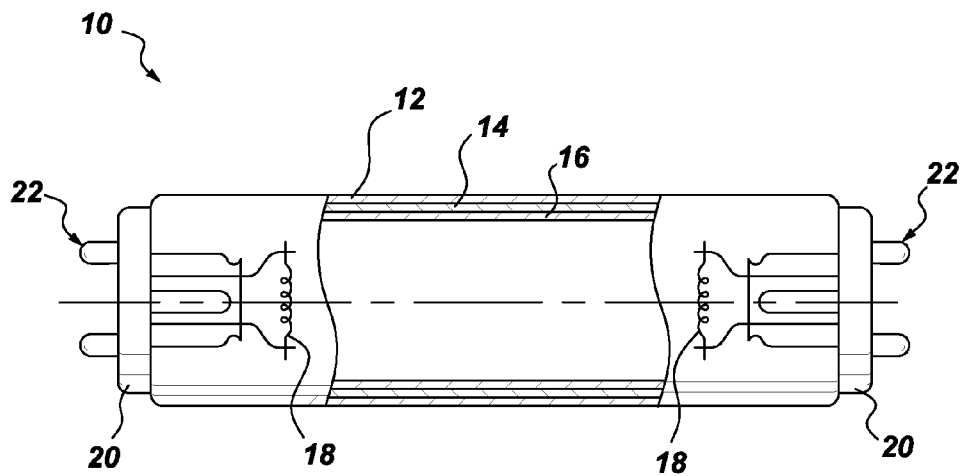
Fig. 1
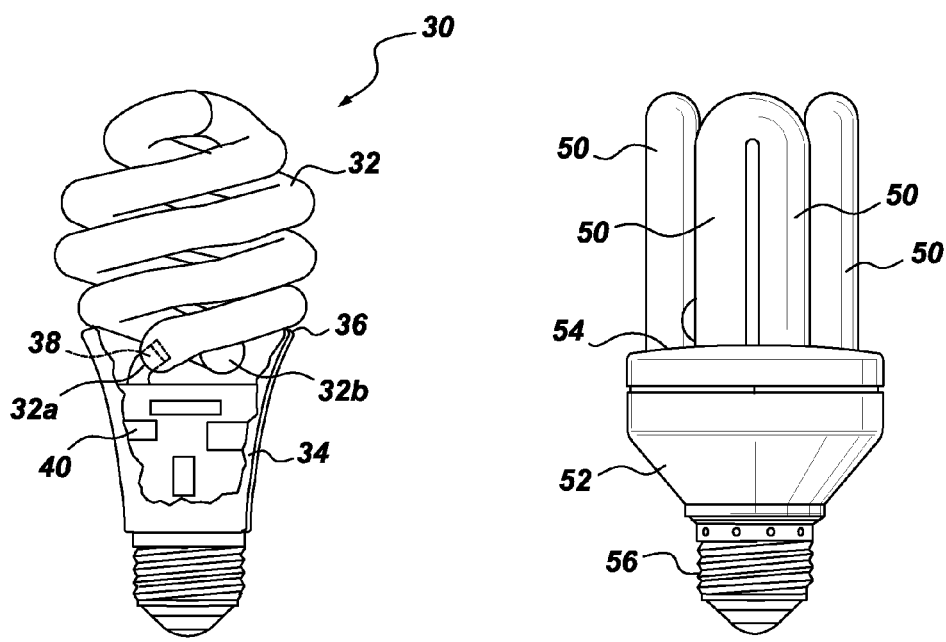
Fig. 2        Fig. 3

GREEN EMITTING PHOSPHOR

BACKGROUND

Fluorescent lamps typically have a transparent glass envelope enclosing a sealed discharge space containing an inert gas and mercury vapor. When subjected to a current provided by electrodes, the mercury ionizes to produce radiation having primary wavelengths of 185 nm and 254 nm. This ultraviolet radiation, in turn, excites phosphors on the inside surface of the envelope to produce visible light which is emitted through the glass. In some conventional fluorescent lamps, efficient illumination of a white color is provided using a blend of red, green and blue-emitting phosphors.

One of the phosphors commercially used in fluorescent lamps is terbium-doped lanthanum phosphate (LAP), which typically contains 13-15 mole % terbium and about 27-33 mole % cerium. With the rapidly increasing cost of rare earth elements driven by the increasing demand for these materials in various applications and their current limited availability, phosphors with very low RE content that can replace the present rare earth based fluorescent lamp phosphors, such as LAP, are highly desirable.

BRIEF DESCRIPTION

Briefly, in one aspect, the present invention relates to cerium, gadolinium and terbium doped aluminum phosphates of formula I $$Al_{1-x-y-z-a-b-c-d-e}Tb_xCe_yGd_zLu_aSc_bIn_cLa_dGa_ePO_4 \quad (I)$$

wherein x is greater than or equal to about 0.001 and less than or equal to about 0.3;

y is greater than or equal to about 0.001 and less than or equal to about 0.3;

z is greater than or equal to about 0.01 and less than or equal to about 0.3;

a is greater than or equal to about 0.01 and less than or equal to about 0.1;

b is greater than or equal to about 0.01 and less than or equal to about 0.1;

c is greater than or equal to about 0.01 and less than or equal to about 0.1.

d is greater than or equal to about 0.01 and less than or equal to about 0.1; and e is greater than or equal to about 0.01 and less than or equal to about 0.1.

In another aspect, the present invention relates to phosphor compositions that contain phosphors of formula I. In yet another aspect, the present invention relates to fluorescent lamps that include these phosphor compositions.

DRAWINGS

These and other features, aspects, and advantages of the present invention will become better understood when the following detailed description is read with reference to the accompanying drawings in which like characters represent like parts throughout the drawings, wherein:

FIG. 1 is a schematic cross-section of a fluorescent lamp according to the present invention.

FIG. 2 is a cross-section of a compact fluorescent lamp according to the present invention.

FIG. 3 is a cross-section of an alternate compact fluorescent lamp according to the present invention.

DETAILED DESCRIPTION

The phosphors of formula I are composed of an aluminum phosphate material containing cerium, gadolinium and terbium dopant ions. The aluminum phosphate has a zeolite-like microporous structure, and dopant ions are situated within pores of the aluminum phosphate structure. The phosphors may also include one or more separate phases composed of cerium phosphate, terbium phosphate, or gadolinium phosphate, in addition to the doped aluminum phosphate material.

Referring to FIG. 1, there is depicted a representative fluorescent lamp 10 comprising an elongated soda-lime silicate glass envelope 12 having a circular cross-section. The low pressure mercury discharge assembly in said lamp includes a pair of spaced conventional electrode structures 18 at each end connected to electrical contacts 22 of a base 20 fixed at both ends of the sealed glass envelope. The discharge-sustaining filling in said sealed glass envelope is an inert gas such as argon or a mixture of argon and other rare earth gases at a low pressure in combination with a small quantity of mercury to provide the low vapor pressure manner of lamp operation. Deposited on the inner surface of the glass envelope is a phosphor layer 16 containing a phosphor of formula I. The green emitting phosphors of the present invention are If no Lu, Sc, In, La or Ga dopant atoms are present in the phosphor, a phosphor according to the present invention has the composition of formula IA $$Al_{1-x-y-z}Tb_xCe_yGd_zPO_4 \quad (IA)$$

where x, y, and z are as defined above.

The amount of terbium in the phosphors ranges from greater than or equal to 0.1 mol % to about 30 mol %; particularly from greater than or equal to about 0.5 mol % to about 5 mol %; and more particularly from greater than or equal to about 0.5 mol % to about 3 mol %. In these embodiments, x in formula I and IA ranges from x is greater than or equal to about 0.001 and less than or equal to about 0.3; from greater than or equal to about 0.005 and less than or equal to about 0.05, and from greater than or equal to about 0.005 and less than or equal to about 0.03, respectively. In specific embodiments, the amount of terbium is about 2.7 mol %, or x is about 0.027.

The amount of cerium in the phosphors ranges from about 0.1 mol % to about 30 mol %, and particularly from about 0.5% to about 5%. In these embodiments, y in formula I and IA ranges from greater than or equal to about 0.001 and less than or equal to about 0.3, and from greater than 0.005 and less than or equal to about 0.05, respectively. In specific embodiments, the amount of cerium is about 5 mol %, or y is about 0.05.

The amount of gadolinium in the phosphors ranges from about 0.1 mol % to about 30 mol %, and particularly from about 0.5% to about 5%. In these embodiments, z in formula I and IA ranges from greater than or equal to about 0.001 and less than or equal to about 0.3, and from greater than 0.005 and less than or equal to about 0.05, respectively. In specific embodiments, the amount of gadolinium is about 5 mol %, or z is about 0.05. Examples of phosphors according to the present invention are $Al_{0.89}Tb_{0.01}Ce_{0.05}Gd_{0.05}PO_4$ and $Al_{0.89}Tb_{0.027}Ce_{0.05}Gd_{0.05}PO_4$.

In some embodiments of the invention, lamp 10 has a second layer of material 14 positioned between the phosphor blend layer 16 and the inner surface of the glass envelope 12. This second layer can be a second phosphor layer comprising a conventional calcium halophosphate phosphor. Alternately or in addition to a second phosphor layer, the second layer can be an ultraviolet reflecting barrier layer as is known in the art. Such a barrier layer can comprise, for example, a mixture of alpha- and gamma-aluminum particles.

The luminescent material described above may be used in many different applications. For example, the material may be used as a phosphor in lamp, in a cathode ray tube, in a plasma display device or in a liquid crystal display. The material may also be used as a scintillator in an electromagnetic calorimeter, in a gamma ray camera, in a computed tomography scanner or in a laser. These uses are meant to be merely exemplary and not exhaustive. In a preferred embodiment, the phosphor is used in a fluorescent light, as described above.

Phosphors according to the present invention may be made by any ceramic powder method, such as a liquid phase (flux) method or a solid state method. Preferably, the method of making the phosphor comprises the following steps. First, compounds of the phosphor material are mixed in a crucible or another suitable container, such as a ball mill. For example, the starting materials may be blended using a ball mill with $ZrO_2$ or yttrium toughened zirconia milling media. The preferred starting phosphor compounds comprise oxides, carbonates, hydroxides, nitrates or oxalates of the metal constituents. For example, to form $Al_{0.89}Tb_{0.027}Ce_{0.05}Gd_{0.05}PO_4$, alumina, cerium oxide, terbium oxide, gadolinium oxide and ammonium phosphate may be mixed in the crucible or ball mill.

The blended materials may then fired in air or a reducing atmosphere for 5-15 hours at 800 to 1200° C., preferably for 5 hours at 960° C. to sinter the material. The reducing atmosphere may comprise forming gas (2 percent hydrogen and 98 percent nitrogen). Preferably, the starting materials also contain a flux that promotes the reaction of the starting materials during the firing step to form the ceramic phosphor. Preferably, the flux comprises a halogen compound, such as a fluoride or a chloride compound. The preferred halogen compounds comprise magnesium, aluminum or strontium fluoride or magnesium, strontium, manganese or ammonium chloride. However, the phosphor may be fired without adding a flux. The fired mixture is then coated onto the substrate, such as a lamp bulb. Preferably, a suspension of the mixture particles and a liquid is used to coat the substrate.

Phosphors according to the present invention are preferably blended with a red phosphor and a blue phosphor to form a phosphor blend 16, for use in lamp 10. The phosphors can be blended with any conventional known and number of phosphors to produce a phosphor blend of the present invention capable of emitting white light. Also included in the blend may be a deep red phosphor and/or a yellow phosphor. Non-limiting examples of suitable blue phosphors include europium activated barium magnesium aluminate, strontium chlorophosphate, and strontium barium calcium chlorophosphate. Non-limiting examples of suitable red phosphors include europium activated gadolinium oxide and yttrium oxide. An exemplary phosphor blend according to the present invention is composed of europium activated yttrium oxide (YEO), and europium activated barium magnesium aluminate (BAM) in addition to a phosphor of formula I or IA. The relative proportions of the individual phosphors in the phosphor blend may be adjusted such that when their emissions are blended, there is produced visible light of predetermined x and y values of CIE coordinates wherein the x value is in the range of about 0.3 to about 0.40, and the y value is in the range of about 0.3 to about 0.40. The combination of phosphors may result in a predetermined color point where the x value is in the range of about 0.3 to about 0.40, and the y value is within about 0.25 of the Planckian locus. Preferably the phosphor blends have substantially uniform and predetermined brightness and CRI. Preferably the brightness is greater than 70 Lms/W, and the CRI is greater than about 80. The proportions of the phosphor components are adjusted to obtain the high brightness and CRI throughout the desirable color point range so that so that lamps have uniformly high brightness and color point. In addition, the resulting fluorescent lamps will have a correlated color temperature (CCT) of 2500-10000, more preferably 3000-6500 K, depending on the relative amounts of the various phosphors used. Additional additives may be included in the phosphor blend and can include a dispersion vehicle, binder and one or more of various known non-luminescent additives, including, e.g., alumina, calcium phosphate, thickeners, dispersing agents, and certain borate compounds as are known in the art.

In the coating procedure, the various phosphor powders are typically blended by weight. The resulting powder is then dispersed in a water vehicle (which may contain other additives as are known in the art, including adherence promoters such as fine non-luminescent particles of alumina or calcium pyrophosphate) optionally with a dispersing agent as is known in the art. A thickener may be added, typically polyethylene oxide. The suspension is then typically diluted with deionized water until it is suitable for producing a coating of the desired thickness or coating weight. In a two coat configuration utilizing a halophosphate base coat, the halophosphate is first applied to the inside of the tube. The phosphor blend suspension is then applied as a coating to the inside of the glass tube (preferably by pouring the suspension down the inside of a vertically-held tube or pumping the suspension up into same) and heated by forced air until dry, as is known in the art. After the first thin coat or layer is applied, additionally desired thin coats or layers may be applied in the same manner, carefully drying each coat before the next coat is applied. In the present invention the thin layers are built up until the total or cumulative coating thickness is sufficient to absorb substantially all of the UV light produced by the arc. Although not intended to be limiting, this typically corresponds to a thickness of between about 1 and about 25 microns, depending on the exact composition of the phosphor blend and the particle size of the phosphors.

EXAMPLES

Example 1

Synthesis of Cerium- and Terbium-doped $AlPO_4$ (1% Ce, 1% Tb)

The sample was made by mixing together 2.0079 g of $Al_2O_3$, 0.0692 g of $CeO_2$, 0.0751 g of $Tb_4O_7$ and 5.3076 g of $(NH_4)_2HPO_4$ (DAP). These materials were blended in a 250 ml Nalgene bottle along with 1.1412 g of $Na_2HPO_4$ and 0.0680 g of $Li_2B_4O_7$ (LTB) as fluxes. The sample was ball milled for one hour along with 10¼" zirconia media and 3½" zirconia media. After milling, the powder was transferred to an alumina crucible and fired at 900 C/5 hrs/0.5% $H_2$. After firing the sample was ground in a mortar and pestle and put through a 60 mesh sieve. The as sieved powder was washed in hot $H_2O$ (2×) for about one hour each. The powders were then filter and dried under a heat lamp. After drying, the material was placed back into a 250 ml Nalgene bottle with 225 grams of ¼" zirconia media and milled for approximately 20 minutes. After the particle size was measured the powder was filtered and dried a second time.

Once the powder was all at the same particle size, measurements of quantum efficiency (QE) and absorption (ABS) were made. This was done by pressing the powder into aluminum plaque and running the spectra against a known standard. The spectrometer that was used was a SPEX Flouorlog double spectrometer. The (ABS) was 68 and the (QE) was 67.

Example 2

Synthesis of Cerium-, Terbium- and Gadolinium-doped AlPO$_4$ (1% Ce, 1% Tb and 1% Gd)

AlPO$_4$ doped with 1% Ce, 1% Tb and 1% Gd was synthesized. The sample was made by mixing together 1.9669 g of Al$_2$O$_3$, 0.0685 g of CeO$_2$, 0.0743 g of Tb$_4$O$_7$, 0.0721 g of Gd$_2$O$_3$ and 5.2527 g of (NH$_4$)$_2$HPO$_4$ (DAP). These materials were blended in a 250 ml Nalgene bottle along with 1.1295 g of Na$_2$HPO$_4$ and 0.0673 g of Li$_2$B$_4$O$_7$ (LTB) as fluxes. The sample was ball milled for one hour along with 10¼" zirconia media and 3½" zirconia media. After milling, the powder was transferred to an alumina crucible and fired at 900 C/5 hrs/ 0.5% H$_2$. After firing the sample was ground in a mortar and pestle and put through a 60 mesh sieve. The as sieved powder was washed in hot H$_2$O (2×) for about one hour each. The powders were then filter and dried under a heat lamp. After drying, the material was placed back into a 250 ml Nalgene bottle with 225 grams of ¼" zirconia media and milled for approximately 20 minutes. After the particle size was measured the powder was filtered and dried a second time.

Once the powder was all at the same particle size, measurements of quantum efficiency (QE) and absorption (ABS) were made. This was done by pressing the powder into aluminum plaque and running the spectra against a known standard. The spectrometer that was used was a SPEX Fluorolog double spectrometer. The (ABS) was 69 and the (QE) was 87. A twenty point increase was seen with the addition of 1% Gd.

Examples 3-20

Design of Experiments (DOE)

To optimize the composition a DOE was performed by varying the ratios of dopants added to the AlPO$_4$. The experiment was set up as Al$_{1-x-y-z}$Ce$_x$Tb$_y$Gd$_z$PO$_4$ where Ce was varied from 0.01-0.05, Tb was varied from 0.01-0.05 and Gd was varied from 0-0.05. The experimental set up can be seen in Table 1 below. Each sample was made in the same way as described above, with the metal oxides along with DAP, Na$_2$HPO$_4$ and LTB and fired at 900 C/5 hrs/0.5% H$_2$. The whole series of sample was tested at the same particle size for QE and ABS.

On the basis of the DOE results, two compositions were selected for further study. The first was Al$_{0.89}$Ce$_{0.05}$Tb$_{0.01}$Gd$_{0.05}$PO$_4$ which represents ~86% reduction in the amount of Tb used as compared to the standard green lamp phosphor LaPO$_4$:Ce,Tb. The second composition was Al$_{0.873}$Ce$_{0.05}$Tb$_{0.027}$Gd$_{0.05}$PO$_4$ which represents ~57% reduction in the amount of Tb used as compared to the standard green lamp phosphor LaPO$_4$:Ce,Tb. Both of the predicted points were synthesized. The Al$_{0.89}$Ce$_{0.05}$Tb$_{0.01}$Gd$_{0.05}$PO$_4$ composition had an ABS of 71 and a QE of 96, while the Al$_{0.873}$Ce$_{0.05}$Tb$_{0.027}$Gd$_{0.05}$PO$_4$ had an ABS of 74 and A QE of 104. XRD analysis of the selected Al$_{0.873}$Ce$_{0.05}$Tb$_{0.027}$Gd$_{0.05}$PO$_4$ composition indicated that the material is a mix of doped AlPO$_4$ and CePO$_4$.

While the invention has been described in detail and with reference to specific embodiments thereof, it will be apparent to one skilled in the art that various changes and modifications can be made therein without departing from the spirit and scope of the invention. For example, as can be seen in FIGS. 2 and 3, phosphors according to the present invention may be used in a compact fluorescent lamp arrangement. With reference to FIG. 2, a helical compact fluorescent lamp 30 is shown, having a lamp envelope or tube 32 in a coiled double helix configuration. End portions 32a, 32b enter the top portion 36 of the housing member 34; disposed within the end portions 32a, 32b are electrodes 38 which are electrically coupled to a ballast circuit arrangement 40 mounted within housing member 34. With respect to FIG. 3, a compact fluorescent lamp having a fluorescent tube 50, a housing 52 closed by a cap 54 and, according to the example, a screw base 56 is seen in side view. The compact fluorescent lamp is connected electrically to the mains through the base known in the art, and wires coming from the connection portions of the base are connected to a ballast circuit arranged inside the housing 52 and/or to electrodes of the fluorescent tube 50.

The invention claimed is:

1. A phosphor of formula I

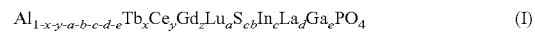

$$Al_{1-x-y-a-b-c-d-e}Tb_xCe_yGd_zLu_aS_{cb}In_cLa_dGa_ePO_4 \qquad (I)$$

wherein x is greater than or equal to about 0.001 and less than or equal to about 0.3;

y is greater than or equal to about 0.001 and less than or equal to about 0.3;

z is greater than or equal to about 0.01 and less than or equal to about 0.3;

TABLE 1

| Std | Run | Component A: Al | Component B: Ce | Component C: Tb | Component D: Gd | Response ABS | Response QE |
|---|---|---|---|---|---|---|---|
| 13 | 1 | 0.931 | 0.032 | 0.01 | 0.027 | 66 | 87 |
| 9 | 2 | 0.882 | 0.05 | 0.05 | 0.018 | 75 | 86 |
| 12 | 3 | 0.931 | 0.01 | 0.032 | 0.027 | 55 | 71 |
| 8 | 4 | 0.935 | 0.031 | 0.031 | 0.002 | 63 | 80 |
| 2 | 5 | 0.94 | 0.05 | 0.01 | 0 | 69 | 92 |
| 16 | 6 | 0.873 | 0.05 | 0.027 | 0.05 | 75 | 98 |
| 10 | 7 | 0.906 | 0.045 | 0.027 | 0.022 | 75 | 94 |
| 18 | 8 | 0.875 | 0.025 | 0.05 | 0.05 | 72 | 90 |
| 6 | 9 | 0.98 | 0.01 | 0.01 | 0 | 49 | 66 |
| 11 | 10 | 0.907 | 0.019 | 0.05 | 0.024 | 68 | 78 |
| 14 | 11 | 0.93 | 0.01 | 0.01 | 0.05 | 61 | 83 |
| 3 | 12 | 0.94 | 0.01 | 0.05 | 0 | 51 | 56 |
| 17 | 13 | 0.903 | 0.015 | 0.032 | 0.05 | 64 | 90 |
| 1 | 14 | 0.94 | 0.05 | 0.01 | 0 | 75 | 49 |
| 5 | 15 | 0.911 | 0.039 | 0.05 | 0 | 71 | 79 |
| 15 | 16 | 0.9 | 0.04 | 0.01 | 0.05 | 76 | 90 |
| 4 | 17 | 0.94 | 0.01 | 0.05 | 0 | 53 | 61 |
| 7 | 18 | 0.98 | 0.01 | 0.01 | 0 | 50 | 65 | a is greater than or equal to about 0.01 and less than or equal to about 0.1;

b is greater than or equal to about 0.01 and less than or equal to about 0.1;

c is greater than or equal to about 0.01 and less than or equal to about 0.1;

d is greater than or equal to about 0.01 and less than or equal to about 0.1; and e is greater than or equal to about 0.01 and less than or equal to about 0.1.

2. A phosphor according to claim 1, wherein x is greater than or equal to about 0.005 and less than or equal to about 0.05.

3. A phosphor according to claim 1, wherein x is greater than or equal to about 0.005 and less than or equal to about 0.03.

4. A phosphor according to claim 1, wherein y is greater than 0.005 and less than or equal to about 0.05.

5. A phosphor according to claim 1, wherein z is greater than 0.005 and less than or equal to about 0.05.

6. A phosphor according to claim 1, wherein x is about 0.01.

7. A phosphor according to claim 1, wherein x is about 0.027.

8. A phosphor according to claim 1, wherein y is about 0.05.

9. A phosphor according to claim 1, wherein z is about 0.05.

10. A phosphor of formula 1A

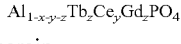

$$Al_{1-x-y-z}Tb_xCe_yGd_zPO_4 \qquad (1A),$$

wherein x is greater than or equal to about 0.001 and less than or equal to about 0.3;

y is greater than or equal to about 0.001 and less than or equal to about 0.3; and z is greater than or equal to about 0.01 and less than or equal to about 0.3.

11. A phosphor according to claim 10, of formula $Al_{0.89}Td_{0.01}Ce_{0.05}Gd_{0.05}PO_4$.

12. A phosphor according to claim 10, of formula $Al_{0.89}Tb_{0.027}Ce_{0.05}Gd_{0.05}PO_4$.

13. A phosphor blend comprising a phosphor of formula I

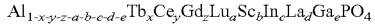

$$Al_{1-x-y-z-a-b-c-d-e}Tb_xCe_yGd_zLu_aSc_bIn_cLa_dGa_ePO_4 \qquad (I)$$

wherein x is greater than or equal to about 0.001 and less than or equal to about 0.3;

y is greater than or equal to about 0.001 and less than or equal to about 0.3;

z is greater than or equal to about 0.01 and less than or equal to about 0.3;

a is greater than or equal to about 0.01 and less than or equal to about 0.1;

b is greater than or equal to about 0.01 and less than or equal to about 0.1;

c is greater than or equal to about 0.01 and less than or equal to about 0.1;

d is greater than or equal to about 0.01 and less than or equal to about 0.1; and e is greater than or equal to about 0.01 and less than or equal to about 0.1.

14. A phosphor blend according to claim 13, additionally comprising europium activated yttrium oxide and europium activated barium magnesium aluminate.

15. A phosphor blend comprising a phosphor of formula 1A

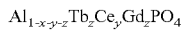

$$Al_{1-x-y-z}Tb_xCe_yGd_zPO_4 \qquad (1A),$$

wherein x is greater than or equal to about 0.001 and less than or equal to about 0.3;

y is greater than or equal to about 0.001 and less than or equal to about 0.3; and z is greater than or equal to about 0.01 and less than or equal to about 0.3.

16. A phosphor blend according to claim 15, wherein the phosphor is of formula $Al_{0.89}Tb_{0.027}Ce_{0.05}Gd_{0.05}PO_4$.

17. A fluorescent lamp comprising a phosphor layer disposed on an inner surface of a light transmissive envelope, the phosphor layer comprising a phosphor of formula I

$$Al_{1-x-y-z-a-b-c-d-e}Tb_xCe_yGd_zLu_aSc_bIn_cLa_dGa_ePO_4 \qquad (I)$$

wherein x is greater than or equal to about 0.001 and less than or equal to about 0.3;

y is greater than or equal to about 0.001 and less than or equal to about 0.3;

z is greater than or equal to about 0.01 and less than or equal to about 0.3;

a is greater than or equal to about 0.01 and less than or equal to about 0.1;

b is greater than or equal to about 0.01 and less than or equal to about 0.1;

c is greater than or equal to about 0.01 and less than or equal to about 0.1;

d is greater than or equal to about 0.01 and less than or equal to about 0.1; and e is greater than or equal to about 0.01 and less than or equal to about 0.1.

18. A fluorescent lamp according to claim 17, wherein the phosphor layer additionally comprises europium activated yttrium oxide and europium activated barium magnesium aluminate.

19. A fluorescent lamp according to claim 17, wherein x is greater than or equal to about 0.005 and less than or equal to about 0.05.

20. A fluorescent lamp according to claim 17, wherein x is greater than or equal to about 0.005 and less than or equal to about 0.03.

21. A fluorescent lamp according to claim 17, wherein x is about 0.027.

22. A fluorescent lamp according to claim 17, wherein y is about 0.05.

23. A fluorescent lamp according to claim 17, wherein z is about 0.05.

24. A fluorescent lamp comprising a phosphor of formula 1A

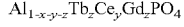

$$Al_{1-x-y-z}Tb_xCe_yGd_zPO_4 \qquad (1A)$$

wherein x is greater than or equal to about 0.001 and less than or equal to about 0.3;

y is greater than or equal to about 0.001 and less than or equal to about 0.3; and z is greater than or equal to about 0.01 and less than or equal to about 0.3.

25. A fluorescent lamp according to claim 24, wherein the phosphor is of formula $Al_{0.89}Tb_{0.027}Ce_{0.05}Gd_{0.05}PO_4$.

* * * * *